United States Patent
Beyda

(10) Patent No.: US 7,158,509 B2
(45) Date of Patent: Jan. 2, 2007

(54) APPARATUS AND METHOD FOR PROVIDING A SECONDARY MESSAGING SYSTEM FOR A TOL COMMUNICATION SYSTEM

(75) Inventor: William J. Beyda, Cupertino, CA (US)

(73) Assignee: Siemens Communications, Inc., Boca Raton, Boca Raton, FL (US)

( * ) Notice: Subject to any disclaimer, the term of this patent is extended or adjusted under 35 U.S.C. 154(b) by 1064 days.

(21) Appl. No.: 10/106,421

(22) Filed: Mar. 26, 2002

(65) Prior Publication Data

US 2003/0185199 A1    Oct. 2, 2003

(51) Int. Cl.
*H04L 12/66* (2006.01)
*H04M 11/00* (2006.01)

(52) U.S. Cl. ............ 370/352; 370/401; 370/465; 375/88.16

(58) Field of Classification Search ............ None
See application file for complete search history.

(56) References Cited

U.S. PATENT DOCUMENTS

| | | | |
|---|---|---|---|
| 6,363,430 B1 * | 3/2002 | Thomas | 709/245 |
| 6,553,116 B1 * | 4/2003 | Vander Meiden | 379/355.08 |
| 6,721,399 B1 * | 4/2004 | Beyda | 379/88.19 |
| 6,842,448 B1 * | 1/2005 | Norris et al. | 370/352 |
| 6,917,676 B1 * | 7/2005 | Yoshida et al. | 379/207.02 |
| 6,959,072 B1 * | 10/2005 | Lee | 379/76 |
| 6,999,431 B1 * | 2/2006 | Rines | 370/328 |

* cited by examiner

*Primary Examiner*—Doris H. To
*Assistant Examiner*—Soon D. Hyun

(57) ABSTRACT

An external or secondary messaging system is coupled to a ToL system for providing a temporary storage cache where messages may be left when elements of ToL system cannot be reached do to outage events. The secondary messaging system is located outside the area of the ToL system that may be subject to the outage event and hides the outage event from the caller (i.e., the caller leaves a message on a messaging system he or she believes the normal messaging system of the party called).

28 Claims, 6 Drawing Sheets

| DEVICE | | CALL TYPE 608 | | |
|---|---|---|---|---|
| | | CALL TYPE 1 | CALL TYPE 2 | CALL TYPE N |
| DEVICE 1 | EVENT 1 | DIVERT ACTION | DIVERT ACTION | DIVERT ACTION |
| | EVENT 2 | DIVERT ACTION | DIVERT ACTION | DIVERT ACTION |
| | EVENT N | DIVERT ACTION | DIVERT ACTION | DIVERT ACTION |
| DEVICE 2 | EVENT 1 | DIVERT ACTION | DIVERT ACTION | DIVERT ACTION |
| | EVENT 2 | DIVERT ACTION | DIVERT ACTION | DIVERT ACTION |
| | EVENT N | DIVERT ACTION | DIVERT ACTION | DIVERT ACTION |
| DEVICE N | EVENT 1 | DIVERT ACTION | DIVERT ACTION | DIVERT ACTION |
| | EVENT 2 | DIVERT ACTION | DIVERT ACTION | DIVERT ACTION |
| | EVENT N | DIVERT ACTION | DIVERT ACTION | DIVERT ACTION |

FIG. 6

APPARATUS AND METHOD FOR PROVIDING A SECONDARY MESSAGING SYSTEM FOR A TOL COMMUNICATION SYSTEM

BACKGROUND OF THE INVENTION

The present invention relates generally to distributed communication systems, in particular, telephony-over-local area network (LAN) (ToL) communication systems, and the like, and more specifically, to an apparatus and method for providing an alternative or secondary voice messaging system for a distributed communication network.

Distributed communication systems such as telephony-over-LAN (ToL) communication systems and the like are highly complex networked systems containing a plurality of elements or devices for routing calls to users of the system. For example, an exemplary ToL system might include a network having two or more sub-networks, each sub-network including a plurality of clients providing communication services to multiple users. Such a ToL system may further include one or more gatekeepers for assisting in the routing of calls to destinations within the system, a gateway for interconnecting the ToL system with an external switched circuit network such as the public switched telephone network (PSTN) or a private branch exchange (PBX), a multipoint control unit (MCU) providing support for conferences of three or more clients, a messaging server, a feature server, and the like.

When an event such as a power failure, a network or sub-network outage, or a site closure due to weather or disaster renders elements of a ToL system inoperative, it is desirable to divert calls received during the event to a messaging server, voicemail server, or the like so that the call may be answered. However, because of the complexity of typical ToL systems, forwarding of calls to messaging systems within a ToL system may involve many steps. For example, a call from an external caller may first go through a gateway. The gateway may then consult a gatekeeper and be routed to a client of the ToL system such as an IP (Internet Protocol) telephone, personal computer soft client, or the like. If the client provides no response, the call may be forwarded to a messaging system where a voicemail message may be left for the user. Further, some ToL systems may employ a messaging system using native IP or other protocols to link with the ToL system. Moreover, some ToL systems may have only one domain while other ToL systems may have many. As a result, during an outage of the ToL system caused by power failure, network or equipment failure, or the like, it is likely that an external caller may be unable to leave a message on the messaging system employed by the ToL system, because the gateway cannot reach through the broken network to reach the messaging system and would instead experience fast busy or ring-no-answer tones.

Consequently, it is desirable to provide a communication system having an external or secondary messaging system that is coupled to the ToL system for providing a temporary storage cache where messages may be left when elements of the ToL system cannot be reached due to outage events.

SUMMARY OF THE INVENTION

The present invention is directed to an external or secondary messaging system that is coupled to a ToL system for providing a temporary storage cache where messages may be left when elements of ToL system cannot be reached do to outage events. Preferably, the secondary messaging is located outside the area of the ToL system that may be subject to the outage event and hides the outage event from the caller (i.e., the caller leaves a message on a messaging system he or she believes to be the normal messaging system of the party called).

According to a specific embodiment, the present invention provides a communication system capable of furnishing emergency call diversion to a messaging system. The communication system is comprised of a ToL system including an initial entry device for receiving a call from an external network for a client of the ToL system. A messaging system is interconnected with the ToL system so that the messaging system remains operational during an outage of the ToL system. The initial entry device is capable of causing the call to be diverted to the messaging system for providing a response to the call during the outage of the ToL system.

According to another specific embodiment, the present invention provides a method for furnishing emergency call diversion from a ToL system to a messaging system. The method includes the steps of recognizing that a state exists within the ToL system requiring diversion of calls to a secondary messaging system, the messaging system being interconnected with the ToL system so that the messaging system remains operational during an outage of the ToL system; receiving a call from an external network for a client in the ToL system; and causing the call to be diverted to the secondary messaging system for providing a response to the call during the outage of the ToL system.

It is to be understood that both the foregoing general description and the following detailed description are exemplary and explanatory only and are not necessarily restrictive of the invention claimed. The accompanying drawings, which are incorporated in and constitute a part of the specification, illustrate embodiments of the invention and together with the general description, serve to explain the principles of the invention.

BRIEF DESCRIPTION OF THE DRAWINGS

FIG. 6 is a table representing an exemplary rules database for providing rules based call diversion in a ToL system such as the system shown in FIG. 1.

DETAILED DESCRIPTION OF SPECIFIC EMBODIMENTS

Reference will now be made in detail to the presently preferred embodiments of the invention, examples of which are illustrated in the accompanying drawings.

Figure 1:
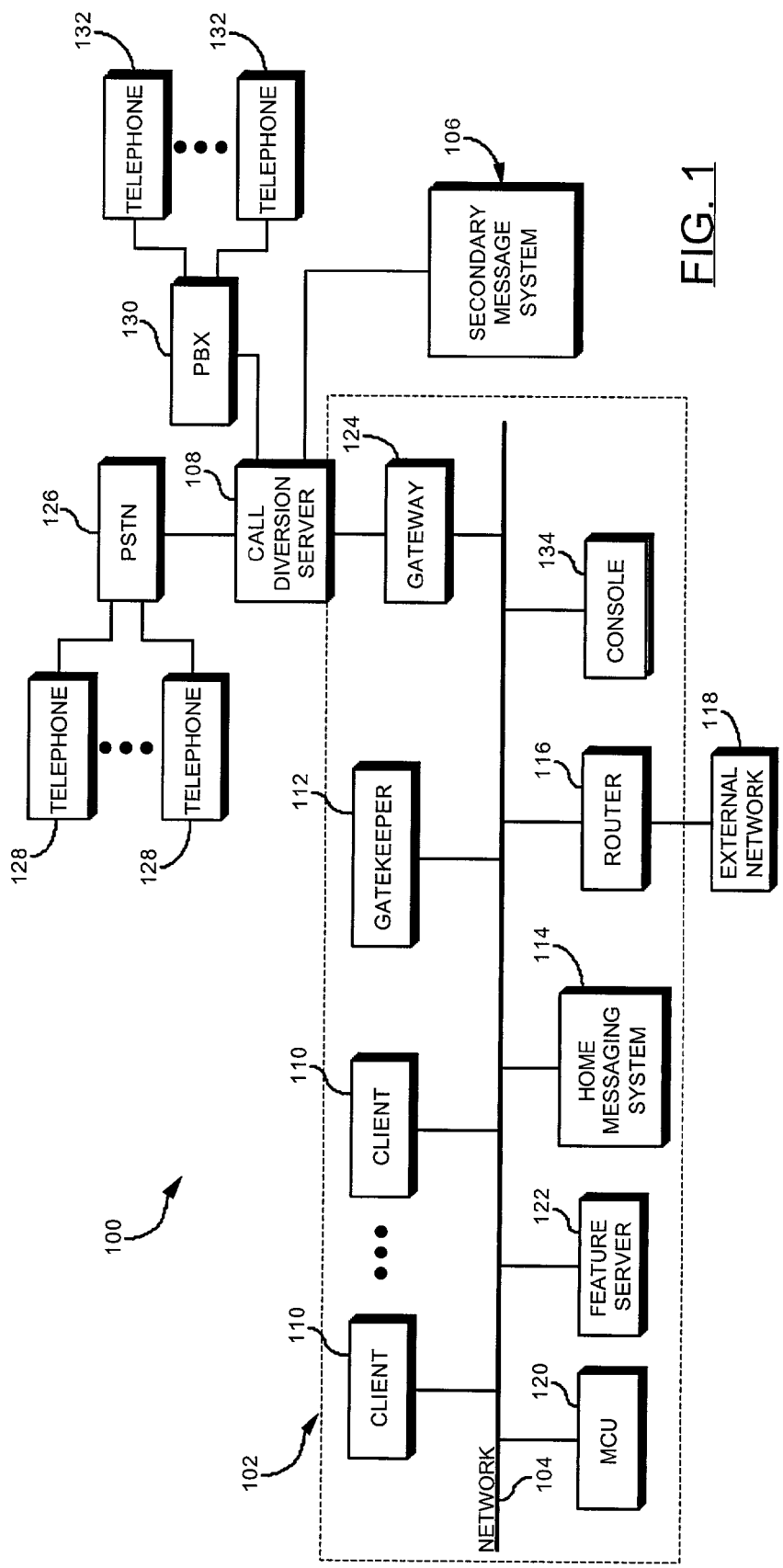
FIG. 1 is a block diagram illustrating an exemplary communication system employing a secondary messaging system providing temporary storage of messages that cannot reach destinations within a ToL system due to network or equipment failure or outage.

FIG. 1 illustrates exemplary communication system employing a secondary messaging system providing temporary storage of messages that cannot reach destinations within a ToL system due to network or equipment failure or outage, in accordance with an exemplary embodiment of the present invention. Communication system 100 is comprised of a ToL system 102 providing multimedia communication services including audio, video and data communications over a packet network 104 such as an IP network, an Internet packet exchange (IPX), local area network (LAN), enterprise network (EN), or the like. An external or secondary messaging system 106 is interconnected with ToL system 102 so that the messaging system 106 remains operational during an outage of the ToL system 102. During an outage of ToL system 102, an initial entry device (e.g., call diversion server 108) is capable of causing a call received by the ToL system 102 to be diverted to messaging system 106, which provides a response to the call.

In the exemplary embodiment shown, ToL system 102 includes one or more endpoint terminals or clients 110 that are coupled to packet network 104 for providing real-time bi-directional audio, and optionally video, and/or data communications. Clients 110 may include "hard" clients such as IP telephones, terminal adapters coupled to analog telephones or facsimile machines, and the like, or "soft" clients comprised of personal computers having audio (and optionally video) capability running suitable client software. ToL system 102 may further include one or more gatekeepers 112 for assisting in the process of routing calls to destinations (e.g., clients 110, home messaging server 114, etc.) within ToL system 102. Gatekeepers 112 may also provide services such as address resolution, admission control, and accounting. One or more routers 116 may be provided for routing calls over the network 104 and/or between the network 104 and an external network 118 employing like protocols. In exemplary embodiments of the invention, ToL system 102 includes home messaging server or system 114 providing message and voicemail service, a multipoint control unit (MCU) 120 for providing multipoint (i.e., conference) voice and video calls, a feature server 122 for providing supplementary services such as calling card authorization, call pickup/call park, and the like. ToL system 102 may further include one or more gateways 124 for interconnecting network 104 with a dissimilar network. Preferably, gateway 124 provides conversion of signaling protocols as well as media transmission formats between the networks. For example, in the embodiment shown, gateway 124 connects network 104 to a public switched telephone network (PSTN) 126 having telephones 128 and/or a PBX 130 having telephones 132. Gateway 124 provides conversion of the signaling protocols and media transmission formats of the PSTN 126 and PBX 130 and the ToL system network 104.

Secondary messaging system 106 provides a temporary storage cache where messages may be left when elements of ToL system 102 cannot be reached due to such outage events. Preferably, secondary messaging system 106 is located outside the area of ToL system 102 that may be subject to the outage event. For instance, in exemplary embodiments, messaging system 106 may be off-site (i.e., located in a separate facility or building), or, if on-site, may be located near the entry point to network 104 (e.g., near call diversion server 108, gateway 124, or the like), allowing ToL system outages and failures to be hidden from external callers. In this manner, the messaging system 106 serves as a failure recovery mechanism for ToL system 102.

In exemplary embodiments, messaging system 106 may be equipped with default greetings. In one embodiment, secondary messaging system 106 may play a generic greeting (e.g., "The party you have called is not available"). Alternately, secondary messaging system 106 may play an individualized system greeting (e.g., "The party you have called at extension 2123 is not available"). In such embodiments, secondary messaging system 106 may be configured to store a recorded name database. Secondary messaging system 106 may play an individualized, recorded greeting including the appropriate user name (e.g., "The party you have called, John Jones, at extension 2123, is not available"). In further embodiments, secondary messaging system 106 may periodically retrieve stored, recorded greetings from the home messaging system of the party called. This message may then be played during outage or failure events, further hiding such events from the caller (i.e., the caller leaves a message on a messaging system he or she believes is in the home system of the party called). Preferably, messages left by callers during the outage or failure event are later forwarded to home messaging system 114 when the outage event has passed.

The initial entry device to the ToL system 102 (e.g., call diversion server 108, gateway 124, PBX 130, etc.) diverts calls to the secondary messaging system 106 when the downstream systems (e.g., home messaging system 114) are unavailable due to an outage event. Preferably, the initial entry device includes appropriate digital signal processing (DSP) hardware as needed for codec/tone functions. For instance, in the exemplary embodiment shown in FIG. 1, diversion of calls to secondary messaging system 106 is provided by call diversion server 108, which may be comprised of software resident on gateway 124, or alternately may comprise a separate stand alone device coupled to gateway 124. The caller may then leave a message in a mailbox in the secondary messaging system 106. Further, regardless of whether a message is left by the caller, the identification of the caller or Caller ID (e.g., name, telephone number, date and time of call, etc.) may be recorded.

In exemplary embodiments, each mailbox in secondary messaging system 106 is identified using conventional means (e.g., via identification information entered by the caller, through Direct Inward Dial (DID)/called number identification techniques, or the like). The identification of the home messaging system 114 employed by the user may be stored within the configuration of the mailbox assigned to the user within secondary messaging system 106. When the outage event is over, secondary messaging system 106, which regularly polls the home system to check for its fitness, may relay the message to the home system and clear its storage cache. Secondary messaging system 106 may further provide offsite retrieval functions for allowing message retrieval by the user during the outage from an external location (e.g., an external PSTN telephone 128, a PBX telephone 132, or the like) during or after the outage event.

In the exemplary embodiment shown in FIG. 1, call diversion server, represented by block 108, controls call diversion behavior of devices within the ToL system 102, and optionally of legacy systems and devices coupled to the ToL system such as PBX 130. In exemplary embodiments, elements of call diversion server 108 may be implemented as software comprised of sets of instructions distributed among multiple devices within the ToL system 102. In this manner, calls received in the ToL system 102 may be diverted from different points within the network 104, and with different diversion behaviors as necessary. Additionally, call diversion server 108 may include one or more specialized call diversion devices coupled to network 104 or alternately to other devices coupled to the network 104. Such call diversion devices may be necessary to provide internetworking with legacy systems and devices such as PSTN 126 and PBX 130. For instance, in the embodiment shown in FIG. 1, call diversion server 108 may be implemented as software distributed between gatekeeper 112 and gateway 124, or, alternatively, a specialized device disposed between gateway 124 and external networks such as PSTN 126 and PBX 130. In this manner, call diversion server 108 may provide desired call diversion for a variety of system outages ranging from outages of the entire network 104, or a sub-network thereof (in embodiments where network 104 comprises multiple sub-networks) due to events such as power outages, router failures, gatekeeper failures, gateway failures, and the like, to outages or inadvertent or intentional disconnection of a single device such as a client 110, MCU 120, home messaging server 114, or the like.

Call diversion server 108 causes a call received in the ToL system 102 to be processed according to a set of predetermined diversion rules upon recognizing that a state exists within the system 102 requiring diversion of the call. In this manner, a call received within the ToL system 102 may be diverted to a safe destination such as secondary messaging system 106, a home messaging system 114 (if available), or the like, and not go unanswered. In exemplary embodiments, these predetermined diversion rules may be provided by a database or the like (see FIG. 6) accessible by elements of the call diversion server 108 of a given device.

In exemplary embodiments, the existence of a call diversion state or mode (i.e., a state requiring call diversion for at least one device within the ToL system 102) is communicated to call diversion server 108 via a divert protocol element or command (hereinafter referred to as "EnterDivertMode") provided in response to detection of an event such as a power outage or the like, wherein call diversion is required. The EnterDivertMode command may be sent to all devices within ToL system 102 affected by the event on which elements call diversion server is implemented. All affected devices can go into the call diversion state or mode. Each such device, depending on its function within the network 104, is configured to respond to the EnterDivertMode command in a manner allowing desired call diversion to be implemented. For example, in the embodiment wherein call diversion server 108 is distributed between gatekeeper 112 and gateway 124, gateway 124 may be configured to route calls to secondary messaging system 106 upon receiving the EnterDivertMode command. Similarly, gatekeeper 112 may automatically route internal calls directly to home messaging server or system 114 rather than to a client 110 such as a desktop telephone, or the like, knowing via receipt of the EnterDivertMode command that the client 110 is not operational and thus would not properly forward the call to the messaging system 114 on ring-no answer conditions.

In exemplary embodiments, the EnterDivertMode command may be issued from a central network management console 134 coupled to network 104. Alternately, an affected device (e.g., gatekeeper 112, gateway 124, or the like) may issue the command. Moreover, the EnterDivertMode command may be issued by a human operator (e.g., via central network management console 134, or the like), or may be initiated algorithmically based on alarms triggered by the event.

When the event requiring call diversion has passed (e.g., power is restored or the failure condition is resolved, etc.), the call diversion state is ended. Call diversion server 108 recognizes that the call diversion state has passed and causes normal call processing to be resumed. In exemplary embodiments, the end of the call diversion state is communicated to call diversion server 108 via a second divert protocol element or command (hereinafter referred to as "ExitDivertMode") provided in response to detection that the event requiring call diversion has passed. The ExitDivertMode command may be sent to all devices within ToL system 102 that were also sent the EnterDivertMode command. Like the EnterDivertMode command, the ExitDivertMode command may be issued from a central network management console 134 coupled to network 104, or alternately may be issued by an affected device (e.g., gatekeeper 112, gateway 124, or the like). Further, the ExitDivertMode command may be issued by a human operator (e.g., via central network management console 134, or the like), or may be initiated algorithmically when alarms triggered by the event have been resolved.

ToL system 102 thus replicates the diversion capability of a PBX by using protocol elements or commands EnterDivertMode and ExitDivertMode for communicating between the affected ToL system devices, allowing the call diversion to occur manually or automatically based on a single input, event alarm, or multiple inputs or alarms. In embodiments of the invention, the list of devices within ToL system 102 which receive EnterDivertMode and ExitDivertMode commands in response to a specific event is preconfigured, prior to occurrence of the event so that fast call diversion may be accomplished when the event actually occurs. However, if multicast is enabled within the ToL system 102, such preconfiguration is not necessary, since EnterDivertMode and ExitDivertMode commands may be routed to multiple devices within the ToL system simultaneously.

Figure 2:
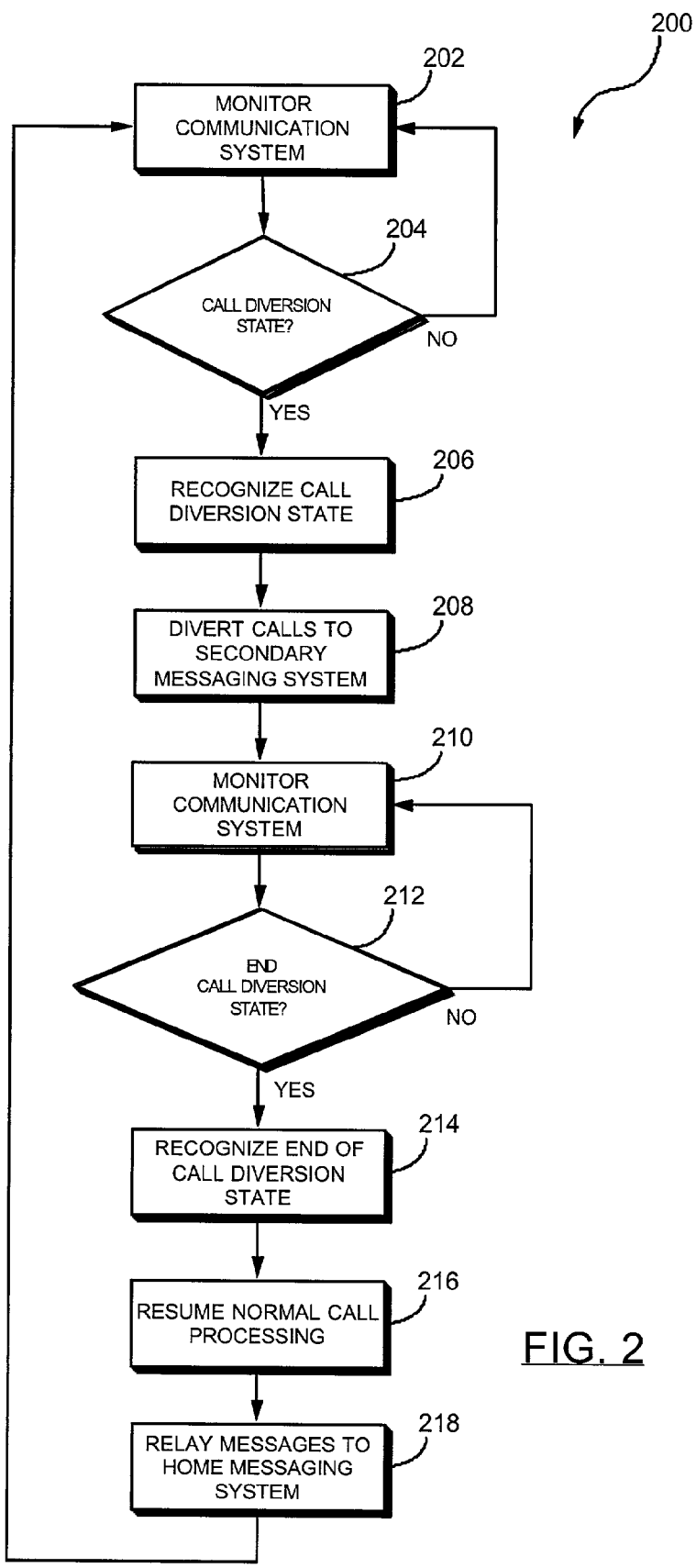
FIG. 2 is a flow diagram illustrating an exemplary method for providing emergency call diversion to a secondary messaging system from a ToL system such as the system shown in FIG. 1.
Figure 3:
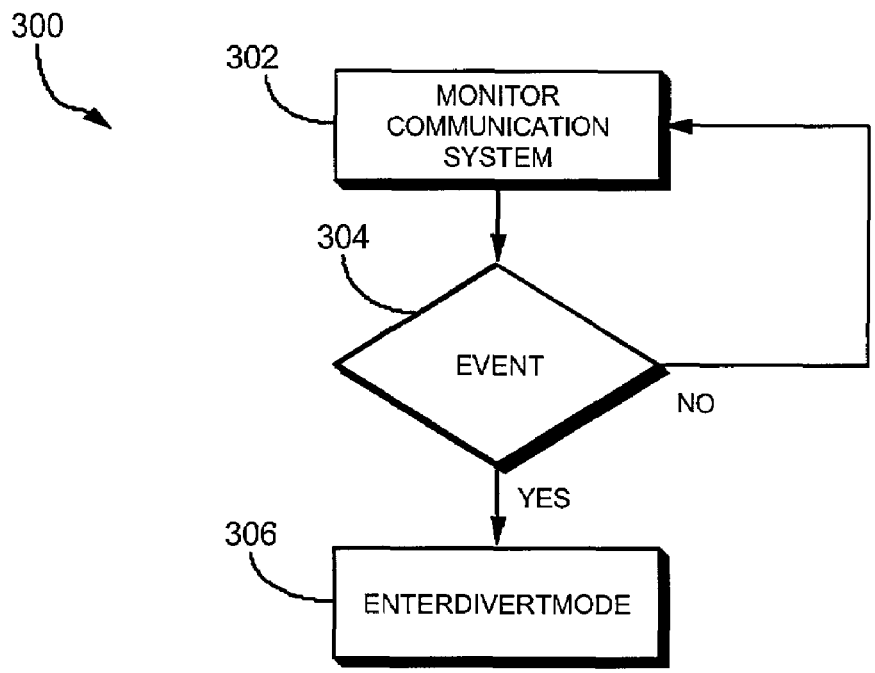
FIG. 3 is a flow diagram illustrating an exemplary method for allowing devices within a ToL system to notify one another of the need to enter a call diversion state.
Figure 4:
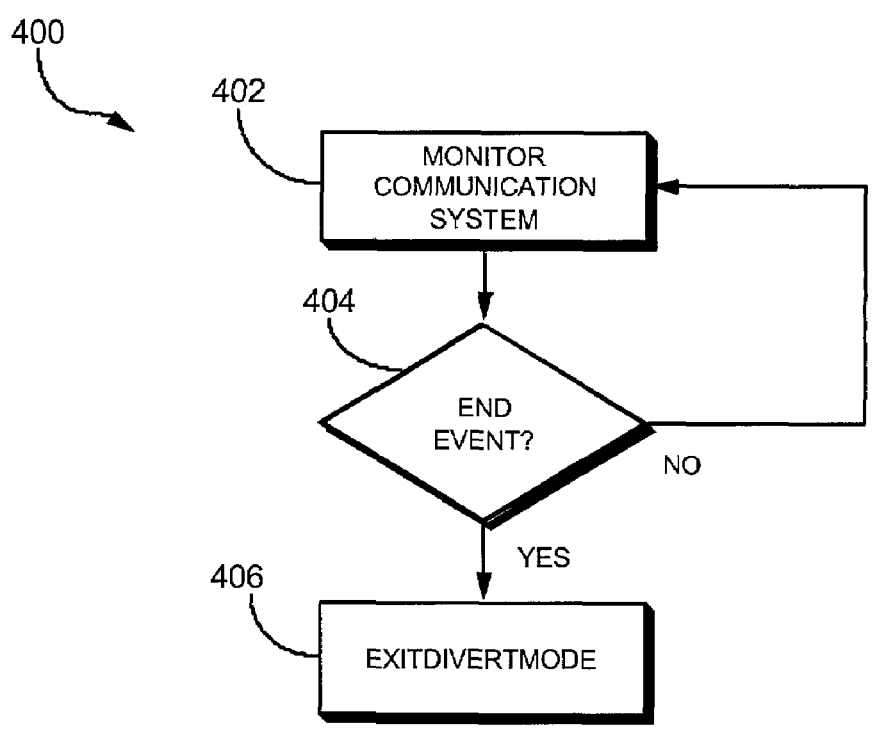
FIG. 4 is a flow diagram illustrating an exemplary method for allowing devices within a ToL system to notify one another that the call diversion state is to be exited.

Referring now to FIGS. 2, 3 and 4, an exemplary method for providing emergency call diversion within a distributed communication system such as the ToL system 102 shown in FIG. 1 is described. The method 200 comprises monitoring the ToL system 102, at step 202, to determine the existence of a state requiring call diversion at step 204. For instance, in the method 300 embodied in FIG. 3, the ToL system may be monitored at step 302 for the occurrence of an event such as a power outage, gateway failure, router failure, gatekeeper failure, or the like, wherein call diversion is required. If at step 304 such an event is determined to have occurred, an EnterDivertMode command is sent in step 306 to devices within the ToL system affected by the event. As discussed in the description of FIG. 1, the EnterDivertMode command may be issued by a human operator (e.g., via central network management console 134 (FIG. 1), or the like), or may be initiated algorithmically by affected devices within the ToL system based on alarms triggered by the event.

Upon receiving the EnterDivertMode command sent at step 306, affected devices within the ToL system recognize the existence of a call diversion state within the system at step 206 in FIG. 2. The affected devices may then process calls that would normally be routed through devices affected by the event according to a set of predetermined diversion rules for providing diversion of the requested call. In exemplary embodiments of the invention, processing of calls is accomplished by querying a database cross-referencing devices in the distributed communication system with types of calls employing those devices for determining a desired diversion action to be taken to effect call diversion for the requested call. Such a matrix is described in the discussion of FIG. 6. For example, in accordance with the present invention, calls may be diverted to secondary messaging system 106 (FIG. 1), at step 208.

Figure 5:
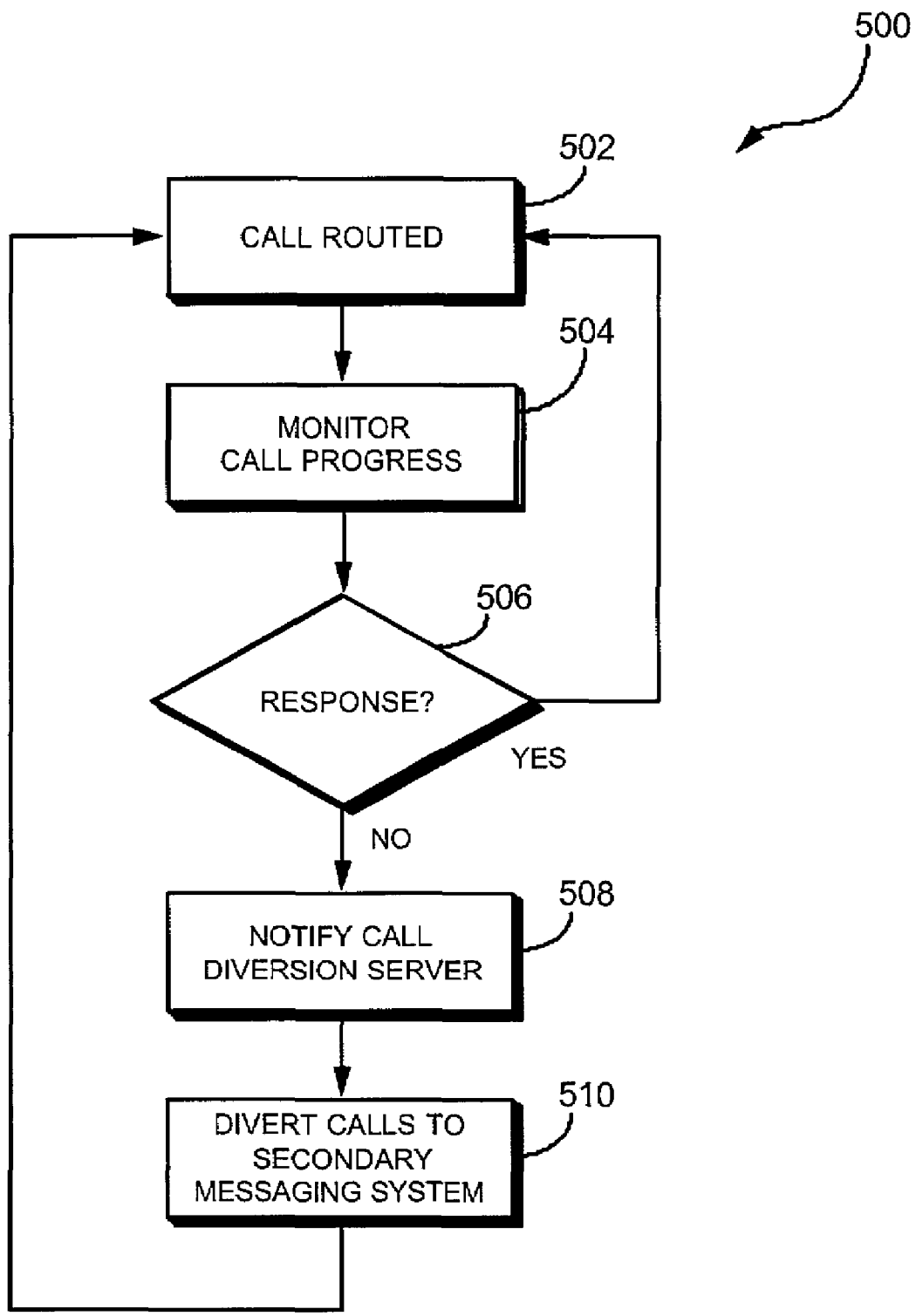
FIG. 5 is a flow diagram illustrating an exemplary method for providing call diversion for a device within a ToL system to a secondary messaging system such as the messaging system shown in FIG. 1.

While in the call diversion state, the ToL system may again be monitored at step 210 to determine when the call diversion state has ended at step 212. For instance, in the method 400 embodied in FIG. 4, the ToL system may be monitored at step 402 for the end or resolution of the event requiring call diversion. If at step 404 the event is determined to have been resolved, an ExitDivertMode command is sent, at step 406, to devices within the ToL system to which the EnterDivertMode command was sent in step 306 (FIG. 3). Like the EnterDivertMode, the ExitDivertMode command may be issued by a human operator (e.g., via central network management console 134 (FIG. 1), or the like), or may be initiated algorithmically when alarms triggered by the event have been resolved. Upon receiving the ExitDivertMode command sent at step 406, affected devices within the ToL system recognize the end of the call diversion state within the system at step 214 and resume normal call processing at step 216. Messages (and/or caller identifications or Caller ID's) may then be relayed to the home messaging system of the ToL system at step 218 to be accessed by users of the system. Referring now to FIG. 5, an exemplary method for providing call diversion for a device within the ToL system shown in FIG. 1 is described. The method 500 is initiated when a call is routed to a client 110 within the ToL system 102 (FIG. 1) at step 502. The call progress is monitored at step 504 for determining whether an appropriate response is provided. Appropriate responses include any normal response to a call. For instance, the call may be completed to the client 110 in a normal fashion, or the call may be routed to a message or voicemail server, a pager, a mobile telephone, or the like if the client does not answer. In exemplary embodiments, the call may activate a timer in elements of call diversion server 108 resident in gatekeeper 124 (FIG. 1). If the call does not receive an appropriate response at step 506 so that answer supervision is returned to the gatekeeper 112 before the timer times out, the call diversion server 108 is notified at step 508, and the call is processed according to a set of predetermined diversion rules for providing diversion of the call at step 510. In exemplary embodiments of the invention, processing of calls in step 510 is accomplished by querying a database cross-referencing devices in the distributed communication system with types of calls employing those devices for determining a desired diversion action to be taken to effect call diversion for the requested call. Such a database is described in the discussion of FIGS. 6 and 7. For example, in ToL system 102 (FIG. 1), if no response is provided by client 110, the call may be routed to home messaging system 114. If no response is provided by home messaging system 114, the call may be routed to secondary messaging system 106. Preferably, the diversion behavior initiated at step 510 lasts only for the duration of the call so that transient events (e.g., a user momentarily unplugging and immediately replugging the network cable of his or her telephone or computer system, etc.) do not result in unwanted diversion of calls.

Figure 7:
FIG. 7 is a table representing an exemplary rules databases for providing rules based call diversion in a ToL system, wherein call diversion actions may be defined by a user of a device within the system.

Turning now to FIGS. 6 and 7, an exemplary rules database for providing rules based call diversion in a distributed communication system such as the ToL system 102 shown in FIG. 1 is described. Rules database 600 is comprised of a matrix 602 cross-referencing device identifications (e.g., "DEVICE 1, DEVICE 2, . . . . DEVICE N") 604 within the ToL system and possible outage events (e.g., EVENT 1, EVENT 2, . . . . EVENT N") 606 for those devices with types of calls (e.g., "CALL TYPE 1, CALL TYPE 2, . . . . CALL TYPE N") 608 processed by the system for determining a desired diversion action ("DIVERT ACTION") 610 to be taken to effect a desired call diversion for a given call. In the embodiment shown in FIG. 6, call types 608 are listed in columns within the matrix 602, while device identifications 604 and associated outage events 606 are listed in rows of the matrix 602. Thus, the diversion action 610 to be taken for a given outage type 606 and call type 608 is provided in the intersecting matrix box of a row containing the appropriate outage event 606 for a given device 604 and a column containing the appropriate call type 608. It will be appreciated by those of skill in the art that the arrangement of matrix 602 is representative of one exemplary embodiment, and other arrangements are possible. For example, a matrix having an alternative arrangement may list call types 608 in rows of the matrix, while device identifications 604 and outage events 606 are listed in columns of the matrix. Accordingly, rearrangement of matrix 602 would not depart from the scope and spirit of the present invention. Moreover, it is contemplated that database structures capable of cross-referencing device identifications 604 and possible outage events 606 for those devices with types of calls 608 processed may be provided that do not employ a matrix or table structure (i.e., a relational database or the like). Accordingly, use of such databases in place of the matrix-based database shown in FIG. 6 would not depart from the scope and spirit of the invention as presented in the appended claims.

As shown in FIG. 1, an exemplary ToL system 102 may include multiple devices including, but not limited to, clients 110 such as an IP telephone or personal computer based soft client, gatekeeper 112, MCU 120, home messaging system 114, feature server 122, and gateway 124, interconnected via network 104. A system administrator may create a hierarchical rules database 600 for the ToL system 102 that is then distributed to devices within the ToL system 102 on which elements of call diversion server 108 are resident, or, alternately, stored to a centralized device or server, that may be accessed by these devices. Preferably, the system administrator identifies each device within the ToL system 102 via a device identification 604 within the matrix 602. Outage events 606 are then determined for the device and cross-referenced with call types 608 the device may process to provide an appropriate diversion action 610. For example, an external call into ToL system 102 may be diverted to a home messaging system 114 if, for example, a client is not responding (see FIG. 5). Similarly, failure of the network 104 (or alternately a sub-network within network 104) may cause the call to be forwarded to a secondary messaging system 106 (FIG. 1).

As shown in FIG. 7, users may add additional information to the rules database to provide user defined diversion actions for certain outage events. For example, a user having a web-based interface with network 104 (FIG. 1) may indicate his or her preferences for outage events that a device or devices he or she uses (e.g., an IP telephone, personal computer soft client, etc.) may experience. These preferences may then be inserted into database 700 as user defined call diversion actions 702 or the like. For example, a user of an IP telephone may indicate that he or she wants calls to the IP telephone forwarded to a cellular telephone should his or her telephone sub-network experience an outage event, and then to a message server if response is provided to the call by the cellular telephone.

In embodiments of the invention, ToL system 102 (FIG. 1) may employ a protocol compliant with the H.323 protocol standard promulgated by the International Telecommunication Union (ITU). The H.323 protocol standard is incorporated herein by reference in its entirety. However, it is contemplated that the present invention may be employed by distributed communication systems employing other protocol standards. For instance, in one embodiment, ToL system may alternately employ protocol complying with the session initiation protocol (SIP) standard or the media gateway control protocol (MGCP) standard, both developed by the Internet Engineering Task Force (IETF), which are incorporated herein by reference in their entirety. Accordingly, implementation of the present invention in such distributed communication systems would not depart from the scope and spirit of the invention.

Although the invention has been described with a certain degree of particularity, it should be recognized that elements thereof may be altered by persons skilled in the art without departing from the scope and spirit of the invention. It is understood that the specific order or hierarchy of steps in the methods 200, 300, 400 & 500 illustrated in FIGS. 2, 3, 4 and 5 are examples of exemplary approaches. Based upon design preferences, it is understood that the specific order or hierarchy of this method can be rearranged while remaining within the scope of the present invention. The accompanying method claims present elements of the various steps of method 200, 300, 400 & 500 in a sample order, and are not meant to be limited to the specific order or hierarchy presented.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A communication system providing emergency call diversion to a messaging system, comprising:
   a Telephony-over-LAN system including an initial entry device for receiving a call from an external network for a client of the Telephony-over-LAN system;
   a messaging system interconnected with the Telephony-over-LAN system so that the messaging system remains operational during an outage of the Telephony-over-LAN system,
   wherein the initial entry device causes the call to be diverted to the messaging system for providing a response to the call during the outage of the Telephony-over-LAN system, the response provided to the call by the messaging system comprising recording at least one of a voicemail message and a caller identification for the call, the Telephony-over-LAN system including a home messaging system having stored therein a recorded greeting for the client, the messaging system periodically retrieving the recorded greeting from the home messaging system so that the recorded greeting is played by the messaging system in response to the call.

2. The communication system as claimed in claim 1, wherein the initial entry device comprises one of a call diversion server, a gateway and a PBX.

3. The communication system as claimed in claim 1, wherein the response provided to the call by the messaging system comprises playing a message.

4. The communication system as claimed in claim 3, wherein the message includes at least one of a telephone number and a name associated with the client.

5. The communication system as claimed in claim 4, wherein the message includes a name associated with the client, the name being retrieved from the Telephony-over-LAN system.

6. The communication system as claimed in claim 1, wherein the messaging system transfers the at least one of a voicemail message and a caller identification for the call to the home messaging system after the outage of the Telephony-over-LAN system has ended.

7. The communication system as claimed in claim 1, wherein a divert command is provided to the initial entry device for informing the initial entry device of the outage.

8. The communication system as claimed in claim 1, wherein the initial entry device causes normal call processing to be resumed upon recognizing that the outage has passed.

9. The communication system as claimed in claim 8, wherein an end divert command is provided to the initial entry device for informing the initial entry device that the outage has passed.

10. The communication system as claimed in claim 1, wherein the Telephony-over-LAN system employs at least one of H.323protocol and session initiation protocol (SIP).

11. A method for providing emergency call diversion from a Telephony-over-LAN system to a messaging system, comprising:
    recognizing that a state exists within the Telephony-over-LAN system requiring diversion of calls to a secondary messaging system, the messaging system being interconnected with the Telephony-over-LAN system so that the secondary messaging system remains operational during an outage of the Telephony-over-LAN system;
    receiving a call from an external network for a client in the Telephony-over-LAN system;
    causing the call to be diverted to the secondary messaging system for providing a response to the call during the outage of the Telephony-over-LAN system:
    recording at least one of a voicemail message and a caller identification for the call; and
    periodically retrieving a recorded greeting for the client from a home messaging system of the Telephony-over-LAN system and playing the recorded greeting in response to the call.

12. The method as claimed in claim 11, further comprising playing a message.

13. The method as claimed in claim 12, wherein the message includes at least one of a telephone number and a name associated with the client.

14. The method as claimed in claim 13, further comprising retrieving a name associated with the client from the Telephony-over-LAN system, and playing a message including the name.

15. The method as claimed in claim 11, further comprising transferring the at least one of a voicemail message and a caller identification for the call to the home messaging system of the Telephony-over-LAN system after the outage of the Telephony-over-LAN system has ended.

16. The method as claimed in claim 11, wherein the step of recognizing that a state exists within the Telephony-over-LAN system requiring diversion of calls to a secondary messaging system comprises receiving a divert command for establishing the call diversion state.

17. The method as claimed in claim 11, further comprising causing normal call processing to be resumed upon recognizing that the outage has passed.

18. The method as claimed in claim 17, wherein the step of causing normal call processing to be resumed upon recognizing that the outage has passed comprises receiving an end divert command for ending the call diversion state.

19. The method as claimed in claim 11, wherein the Telephony-over-LAN system employs at least one of H.323 protocol and session initiation protocol (SIP).

20. A communication system providing emergency call diversion to a massaging system, comprising:
   means for recognizing that a state exists within the Telephony-over-LAN system requiring diversion of calls to a secondary messaging system, the secondary messaging system being interconnected with the Telephony-over-LAN system so that the secondary messaging system remains operational during an outage of the Telephony-over-LAN system;
   means for receiving a call from an external network for a client in the Telephony-over-LAN system;
   means for causing the call to be diverted to the secondary messaging system for providing a response to the call during the outage of the Telephony-over-LAN system;
   means for recording at least one of a voicemail massage and a caller identification for the call; and
   means for periodically retrieving a recorded greeting for the client from a home messaging system of the Telephony-over-LAN system and playing the recorded greeting in response to the call.

21. The communication system as claimed in claim 20, further comprising means for playing a message.

22. The communication system as claimed in claim 21, wherein the message includes at least one of a telephone number and a name associated with the client.

23. The communication system as claimed in claim 20, further comprising means for retrieving a name associated with the client from the Telephony-over-LAN system, and playing a message including the name.

24. The communication system as claimed in claim 20, further comprising means for transferring the at least one of a voicemail message and a caller identification for the call to the home messaging system of the Telephony-over-LAN system after the outage of the Telephony-over-LAN system has ended.

25. The communication system as claimed in claim 20, wherein the means for recognizing that a state exists within the Telephony-over-LAN system requiring diversion of calls to a secondary messaging system comprises means for receiving a divert command for establishing the call diversion state.

26. The communication system as claimed in claim 20, further comprising means for causing normal call processing to be resumed upon recognizing that the outage has passed.

27. The communication system as claimed in claim 26, wherein the means for causing normal call processing to be resumed upon recognizing that the outage has passed comprises means for receiving an end divert command for ending the call diversion state.

28. The communication system as claimed in claim 20, wherein the Telephony-over-LAN system employs at least one of H.323protocol and session initiation protocol (SIP).

* * * * *